No. 785,415. PATENTED MAR. 21, 1905.
C. FREEMAN.
SNOW PLOW.
APPLICATION FILED SEPT. 3, 1904.
2 SHEETS—SHEET 1.
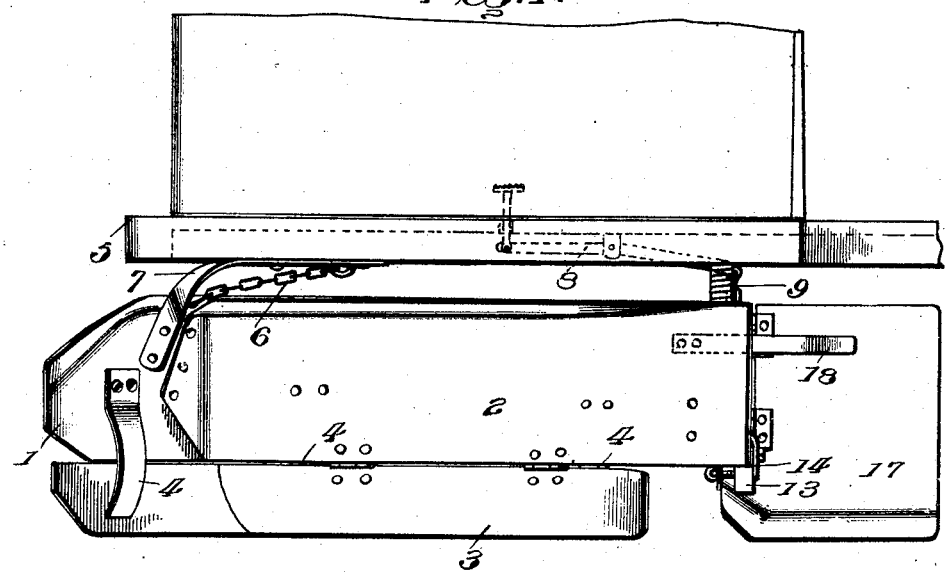
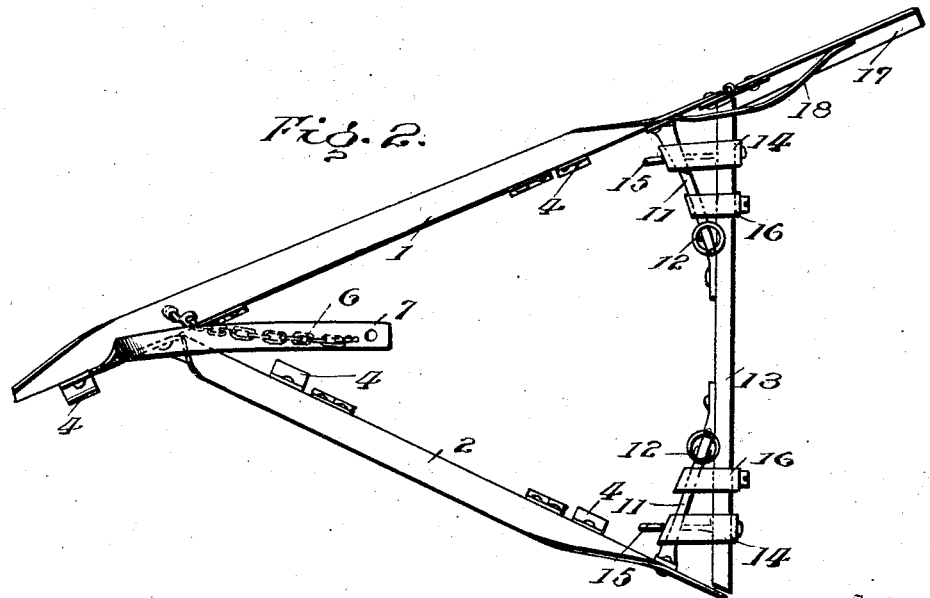
Witnesses
Inventor
C. Freeman
By R.H.&B. Lacey, Attorneys No. 785,415. PATENTED MAR. 21, 1905.
C. FREEMAN.
SNOW PLOW.
APPLICATION FILED SEPT. 3, 1904.

Witnesses
W. V. Woodson
G. F. Watt

Inventor
C. Freeman

By,
R. S. & A. B. Lacey, Attorneys

No. 785,415. Patented March 21, 1905.

UNITED STATES PATENT OFFICE.

CHARLES FREEMAN, OF SCRANTON, PENNSYLVANIA.

SNOW-PLOW.

SPECIFICATION forming part of Letters Patent No. 785,415, dated March 21, 1905.

Application filed September 3, 1904. Serial No. 223,252.

*To all whom it may concern:*

Be it known that I, CHARLES FREEMAN, a citizen of the United States, residing at Scranton, in the county of Lackawanna and State of Pennsylvania, have invented certain new and useful Improvements in Snow-Plows, of which the following is a specification.

This invention appertains to track-clearing apparatus designed more particularly for removing snow from the beds of railroads, and relates most especially to improvements on the plow disclosed in Patent No. 740,572, issued to me and Fred Kiefer October 6, 1903, the purpose being mainly to simplify the general structure and to combine the elements in such a manner as to render the device more subservient to the will of the operator and render its operation more effective, so as to obtain better results and more efficient service.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a snow-plow embodying the invention, showing a portion of a car to indicate in a general way the manner of connecting the same thereto. Fig. 2 is a top plan view of the plow. Fig. 3 is a perspective view of the plow. Fig. 4 is a sectional detail view of the rear portion of a side wing and an end portion of the pilot-board, indicating the connecting and coöperating means. Fig. 5 is a detail perspective view of the rail-shoes and spring-support therefor.

Corresponding and like parts are referred to in the following description and indicated in all the views of the drawings by the same reference characters.

The plow comprises forwardly-converged wings 1 and 2, connected at their forward ends in any determinate manner. One of the wings, as 1, projects forward of the other, so as to prevent the formation of a space into which the snow, slush, or the like would be apt to find entrance in the operation of the plow. Blades 3 are hinged to the lower ends of the wings 1 and 2, and springs 4 span the joint formed between the respective wings and their attached blades, normally serving to hold the latter in a given position, so as to effect the best possible results, said springs permitting the blades 3 to move inward at their lower edges when meeting with unyielding obstructions, thereby preventing disabling of the plow. The blades 3 may be hingedly connected to their respective wings in any manner, and the springs 4 or analogous device may be of any form and arrangement, so long as the desired results are attained.

The platform of the car or truck to which the plow is attached is indicated at 5, and a chain 6 or analogous flexible connection is interposed between the front end of the plow and the forward portion of the platform 5, so as to hold the plow in working position. A spring 7 is interposed between the platform 5 and the forward end of the plow to hold the latter to its work and admit of vertical movement, so that the plow may sweep over the road-bed under all conditions. The rear portion of the plow is vertically adjustable and is supported by means of a lever 8 and connections 9 and 10. The element 9 is preferably a chain, and the parts 10 links which are downwardly diverged and attached at their lower ends to rods or bars 11. The lever 8 is fulcrumed between its ends to the platform or other supporting part 5 and is adapted to be operated either by foot or by hand, as may be found most convenient. Springs 12 normally exert a downward pressure upon the rear portion of the plow, thereby supplementing the action of the springs 7 in holding the plow to its work. These springs 12, as shown, are of the coil type, although it is to be understood that any form or construction may be utilized to attain the purpose aforesaid.

The pilot-board is indicated at 13 and may be connected to the platform or car in any substantial manner. The rods or bars 11 are connected at their outer ends to the rear portions of the respective wings 1 and 2 and are pivoted at their inner ends to the pilot-board 13, the parts being of such arrangement as to admit of the free vertical movement of the rear portion of the plow. A guide 14 is provided near each end of the pilot-board 13 and bolted or otherwise attached thereto. The guides 14 are approximately of U form and each embraces a rod or bar 11 in such a manner as to prevent any appreciable longitudinal play of the plow, while at the same time directing the rear portion of the plow in its vertical movements. A pin 15 coöperates with the guide 14 and is adapted to be passed through one of a series of openings formed in a member of the guide and enter a corresponding opening of the pilot-board, so as to limit the vertical movement of the plow and properly position the same at the outset. The openings 15 and openings in the respective parts 13 and 14 may be substituted by any well-known equivalent which will admit of limiting the vertical movement of the plow and fix its initial position. Other springs 16 are adjustably connected at one end to the pilot-board 13, and the opposite end is bent to engage over the parts 11, so as to exert a downward pressure upon the plow to normally hold same in contact with the road-bed and yet admit of its vertical movement to permit the wings or blades to pass over obstructions without disabling the device. The springs 16 may be used either with or without the springs 12, or both sets of springs may be employed, one supplementing the action of the other.

A wing 17 is hingedly connected to the rear end of a side wing and is adapted to increase the length thereof and to throw the snow or slush at a greater distance from the road-bed and is advantageous when using the plow upon a double track, since it serves to remove the snow from the space intermediate of the two tracks. It is to be understood in this connection that the wing 17 may be applied to either one of the wings 1 and 2 or that each of the latter wings may be provided with a wing 17 should occasion require. The wings 17 may aline with the wing to which it is hinged or may be arranged at an angle thereto, as desired. A spring 18 spans the joint formed between the wings 1 and 17 and serves under normal conditions to hold the wing 17 in a given position and provide for its yielding to clear any obstruction.

Coöperating with the plow are rail-shoes 19 and 20, one of said shoes being hingedly supported and the other having adjustable connection therewith. A spring-arm 21 forms a support for the coöperating shoes 19 and 20 and is attached at one end either to the platform 5, truck, or other convenient portion of the car. A brace 22 is interposed between the shoes and arm 21 to hold the shoes in proper position.

Having thus described the invention, what is claimed as new is—

1. In a snow-plow, the combination of side wings, a pilot-board, and bars connected at their outer ends to the side wings and pivotally attached at their inner ends to said pilot-board, substantially as specified.

2. In a snow-plow, the combination of side wings, a pilot-board, bars connected at their outer ends to the side wings and pivotally attached at their inner ends to said pilot-board, and guides attached to said pilot-board and coöperating with the respective bars to direct the plow in its vertical movements and prevent appreciable longitudinal play thereof, substantially as specified.

3. In a snow-plow, the combination of side wings, a pilot-board, bars connected at their outer ends to the side wings and pivotally attached at their inner ends to said pilot-board, guides attached to said pilot-board and coöperating with the respective bars to direct the plow in its vertical movements and prevent appreciable longitudinal play thereof, and means between said guides and pilot-board to limit the vertical play of the plow and to fix its position at the outset, substantially as specified.

4. In a snow-plow, the combination of side wings, a pilot-board, bars connecting the respective wings to said pilot-board in a manner to admit of vertical play of the plow, an operating-lever and connections between said operating-lever and the aforesaid bars to admit of vertically adjusting the plow, substantially as specified.

5. In combination, a plow comprising side wings, a pilot-board, bars connecting the respective wings to said pilot-board and springs normally exerting a downward pressure upon said bars to hold the plow to its work, substantially as specified.

6. In combination, a plow comprising side wings, a pilot-board, bars connecting the said wings to the pilot-board to admit of the plow having a limited vertical movement, guides between the pilot-board and connecting-bars, means coöperating with said guides to limit the vertical play of the plow and to fix its initial position, springs normally exerting a downward pressure upon said connecting-bars to hold the plow to its work, an operating-lever and bars to admit of vertical adjustment of the plow, substantially as specified.

7. In a snow-plow, the combination of a side wing, a support and coöperating shoes, one of the latter being hingedly connected to said support and the other having adjustable connection with the first-mentioned shoe, substantially as specified.

In testimony whereof I affix my signature in presence of two witnesses.

CHARLES FREEMAN. [L. S.]

Witnesses:
JOHN THEODORE DECKER,
CHARLES H. ALLEN.